United States Patent [19]

Pommier

[11] 4,263,956
[45] Apr. 28, 1981

[54] RADIAL CARCASS TIRE, PARTICULARLY FOR ROAD VEHICLES EMPLOYING CARCASS EXPANSION LIMITING BLOCK

[75] Inventor: Jean Pommier, Clermont-Ferrand, France

[73] Assignee: Compagnie Generale des Etablissements Michelin, Clermont-Ferrand, France

[21] Appl. No.: 117,027

[22] Filed: Jan. 30, 1980

Related U.S. Application Data

[63] Continuation-in-part of Ser. No. 19,182, Mar. 9, 1979, abandoned.

[30] Foreign Application Priority Data

Mar. 10, 1978 [FR] France .................. 78 07388

[51] Int. Cl.³ .................. B60C 9/20; B60C 9/08
[52] U.S. Cl. .................. 152/352 R; 152/354 R; 152/359; 152/361 FP; 152/361 DM
[58] Field of Search .......... 152/352 R, 352 A, 353 R, 152/354 R, 361 R, 361 FP, 361 DM, 359

[56] References Cited

U.S. PATENT DOCUMENTS

| | | | |
|---|---|---|---|
| 2,884,040 | 4/1959 | Boussu et al. ................ | 152/356 |
| 3,018,814 | 1/1962 | Saint-Paul .................... | 152/361 R |
| 3,500,889 | 3/1970 | Boileau ........................ | 152/361 R |
| 3,515,197 | 6/1970 | Boileau ........................ | 152/361 R |
| 4,016,916 | 4/1977 | Ravagnani .................... | 152/361 R |

FOREIGN PATENT DOCUMENTS

| | | | |
|---|---|---|---|
| 1460832 | 10/1966 | France ............................ | 152/361 R |
| 808824 | 2/1959 | United Kingdom ............ | 152/361 R |

Primary Examiner—Caleb Weston
Assistant Examiner—Lois E. Boland
Attorney, Agent, or Firm—Brumbaugh, Graves, Donohue & Raymond

[57] ABSTRACT

A radial carcass tire with a tread reinforcement comprising a wide work ply included between two work plies each having half the width of the wide work ply is improved due to the fact that between this tread reinforcement and the radial carcass reinforcement there is arranged a limiting block composed of two superimposed crossed plies of wires or cables of low extensibility forming with the longitudinal direction of the tire opposite angles, each of which is other than zero and less than one-half of the smallest angle used in the tread reinforcement.

12 Claims, 3 Drawing Figures

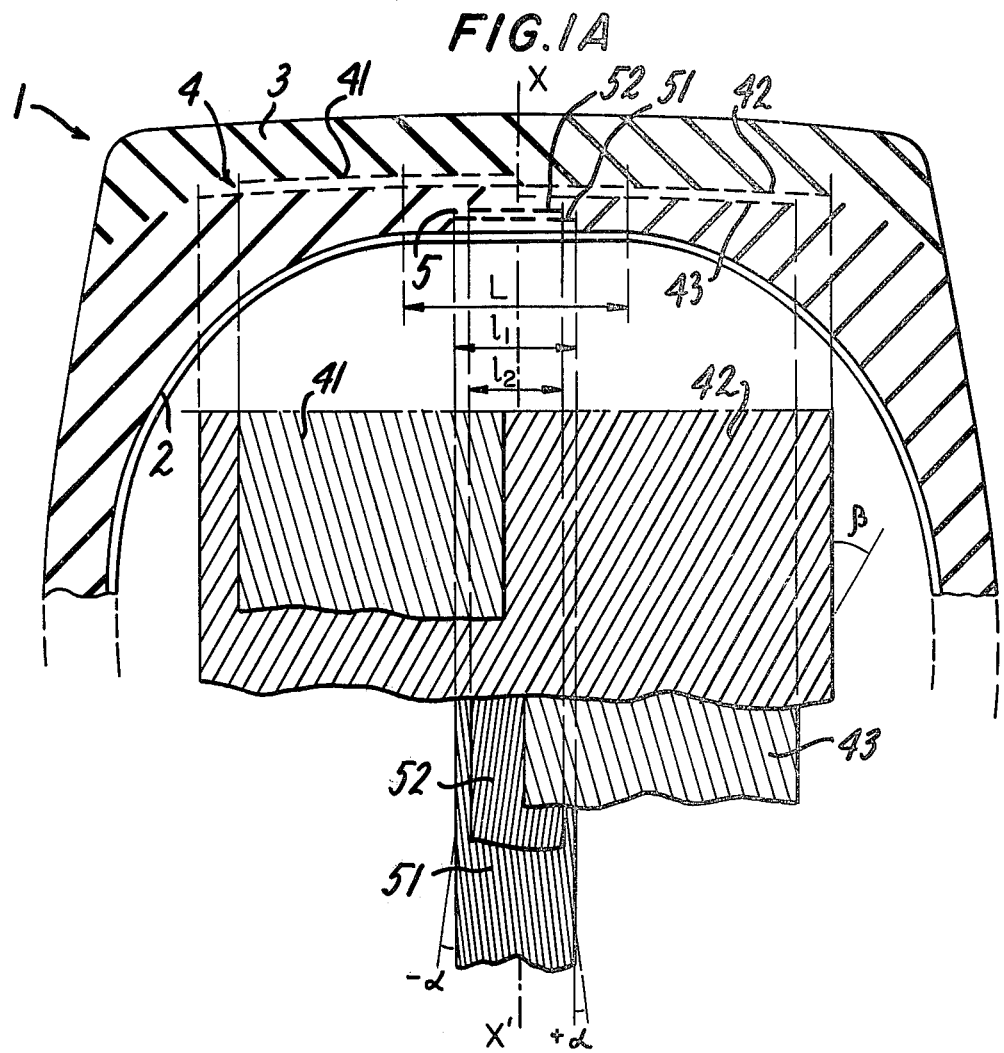
FIG. 1A
FIG. 1B
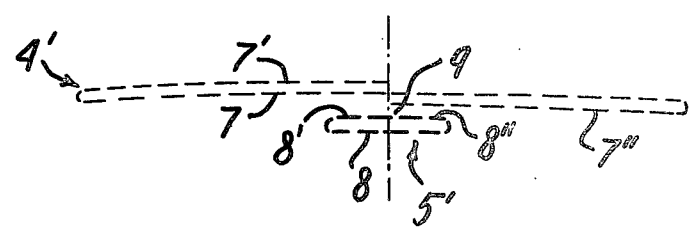
FIG. 2

RADIAL CARCASS TIRE, PARTICULARLY FOR ROAD VEHICLES EMPLOYING CARCASS EXPANSION LIMITING BLOCK

This application is a continuation-in-part application of U.S. application Ser. No. 19,182, filed Mar. 9, 1979, now abandoned.

This invention relates to improvements in tires having a radial carcass reinforcement anchored on both sides to at least one bead ring and with a tread reinforcement comprising a work ply extending approximately over the width of the tread, arranged between two other work plies, one extending approximately over one-half of the width of the tread and the other extending approximately over the other half of the width of the tread, the wires or cables of each work ply being parallel to each other and crossed from one work ply to the next.

Such tires are described in French patent No. 1,460,832, which corresponds to U.S. Pat. No. 3,500,889, in order to overcome the unilateral wear of the tread due to the transfer of load caused by the camber of the roads. This camber is necessary for the drainage of water. The remedy consists in using a radially outer work ply directed to the left in the right-hand tires and to the right in the left-hand tires of the vehicle. In order to avoid having to manufacture two types of tires, the patent proposes using a tread reinforcement of the type described above. By work ply there is understood a ply whose wires or cables form an angle of less than 45° with the longitudinal direction of the tire.

Tires of the type in question duly remedy the irregular wear caused by the camber of the roads or equivalent conditions of travel, lateral inclination of the tire being in all cases compensated for by a shifting of the contact area and corresponding wear of the tread.

However, the arrangement described above lacks durability. This lack consists essentially in breaks of cables of the continuous ply in the equatorial zone. This drawback is due to the placing under tension of the cables of the ply which has substantially the same width as the tread, this tension being maximum at the equator of the tire.

These stresses come from the radial expansion thrust of the radial carcass reinforcement under the action of the inflation pressure. A radial carcass reinforcement naturally tends to increase both its equatorial curvature and its equatorial diameter, as is known per se.

The problem is to remedy this drawback. The solution provided by the invention consists in providing, between the tread reinforcement and the radial carcass reinforcement, in a zone centered on the equator and narrower than an equatorial zone in which these two reinforcements are parallel to one another, a limiting block formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement and preferably between 5° and 10°, this limiting block being parallel to the radial carcass reinforcement.

By wires or cables of low extensibility there are understood wires or cables, preferably metallic, for instance of steel, having a relative elongation Δl/l less than 0.2% under a load equal to 10% of their rupture load. Such cables have a high cable lay of between 12 and 20 times the apparent diameter of the cable. These wires or cables are preferably arranged contiguous to each other.

In order to screen off as well as possible the transmission of the tensions coming from the pressure of the radial carcass reinforcement and taking into account the fact that no ply reinforcement element, even of steel or of glass fibers, is inextensible in actual practice, the invention contemplates arranging the reinforcement elements of the plies of the limiting block at an angle other than zero with respect to the longitudinal direction. The crossed plies have, as a matter of fact, a tendency to decrease the meridian curvature of the limiting block under the effect of an internal pressure.

Under the action of the radial expansion thrust of the radial carcass reinforcement, the limiting block assumes a curvature which increases or decreases with the obliqueness of the plies of the limiting block.

The tension T per unit of width, measured in the axial direction, exerted on a ply by the radial carcass reinforcement can be evaluated in first approximation by means of the formula $$T = p \cdot \frac{R}{2\cos^2\alpha}.$$

In this formula, p is the inflation pressure of the tire, R is the radius of the ply with respect to the axis of rotation of the tire and $\alpha$ is the angle of the cables of the ply with the longitudinal direction. This formula indicates why the invention contemplates using in the limiting block angles $\alpha$ which are less than one-half the smallest angle used in the tread reinforcement. Thus, the tension T of a ply of the limiting block is always less than the tension of the ply having the smallest angle in the tread reinforcement. The elongation of the limiting block under the effect of the tension coming from the radial carcass reinforcement is therefore less. This avoids transmitting this tension to the tread reinforcement.

In practice it is advisable to impart to the limiting block an axial width which is between 60% and less than 100% of the width of the equatorial zone along which the tread reinforcement is parallel to the radial carcass reinforcement. Preferably the limiting block has an axial width of between 5% and 80% of the maximum axial width of the radial carcass reinforcement and, more particularly, between 12% and 20% for a ratio H/B close to 1, between 24% and 40% for a ratio H/B close to 0.75, and between 45% and 80% for a ratio H/B close to 0.3, H being the radial height of the tire on its rim and B being the maximum axial width of the radial carcass reinforcement.

For the limiting block there is preferably also used one ply whose width is between 100% and 90% of the width of the other ply. However, one can also use a ply whose edges are folded so as to meet along a parallel circle, or a ply which is folded on itself.

Embodiments of the invention are described below with reference to the drawing, in which FIG. 1A shows the crown of a tire provided with a limiting block composed of two plies, shown in radial section, alongside of which in FIG. 1B is a plan view of the plies of cables, essential for an understanding of the invention, and FIG. 2 is a view in radial section of another tire crown in accordance with the invention, in which the plies of the tread reinforcement and those of the limiting block are each produced by folding a single ply.

The tire 1 whose crown is shown in radial section in FIG. 1A comprises a radial carcass reinforcement 2, a tread 3, a tread reinforcement 4, and, in accordance with the invention, a limiting block 5.

The radial carcass reinforcement 2 is fixed in known manner (not shown) in the beads of the tire. The tread reinforcement 4 is formed of three superimposed work plies 41, 42, 43. The work ply 42 has almost the width of the tread 3, while the work plies 41 and 43 each have approximately one-half said width. The work ply 42 is arranged between the work plies 41 and 43, which in their turn are each arranged on one side of the equatorial plane of trace X-X'. The wires or cables of the work ply 42 are crossed with those of the work plies 41 and 43 and form acute angles $\beta$ of less than 45° with the longitudinal direction parallel to the equatorial plane X-X'.

The limiting block 5 is formed of two plies 51, 52 between the reinforcements 2 and 4. The radially outer ply 52 has a width $l_2$ which is less than the width $l_1$ of the other ply 51. The limiting block 5 is parallel to the radial carcass reinforcement 2 and centered on the equatorial plane of trace X-X'. The width $l_1$ of the limiting block 5 is less than the width L of the equatorial zone along which there is parallelism between the tread reinforcement 4 and the radial carcass reinforcement 2. The wires or cables of the plies 51, 52 are practically contiguous in each ply and form, with the longitudinal direction, angles $-\alpha$ and $+\alpha$ which are less than one-half of the angle $\beta$ of the cables of the ply 42.

The tread reinforcement 4' and the limiting block 5' shown in FIG. 2 differ from the tread reinforcement 4 and limiting block 5 shown in FIG. 1 in two respects. First of all, the tread reinforcement 4' is formed of a ply 7 which is folded radially outward (flap 7') and radially inward (flap 7"). Then, the limiting block 5' is formed by folding the edges 8' and 8" of a ply 8 in such a manner that they are joined along a parallel circle, for instance, the circle 9 which coincides with the equatorial plane X-X' of the tire.

Although in the foregoing and in the claims which follow reference is made to the smallest angle used for the plies of the tread reinforcement with respect to the longitudinal direction, the invention applies just as well to the case in which the plies in question form equal angles (in absolute value) with said direction, so that the angle which the wires or cables of the limiting block form with the longitudinal direction must be smaller than the angle (and not the smallest angle) of the plies of the tread reinforcement.

Tires according to the invention are used with advantage either on road vehicles or on such vehicles that are intended to run with a strong lateral inclination or a high drift.

It is also useful to employ a limiting block 5 consisting of two crossed plies 51, 52, the wires or cables of which make different angles $\alpha$ in absolute value while remaining of opposite sign. The advantage of such asymmetrical arrangement is to correct, if necessary, lateral (axial) nonuniformity thrusts induced by the tread reinforcement 4, or to prevent, especially in cases where a relatively wide limiting block 5 is used, the generation of such nonuniformity thrusts by the limiting block 5 itself. These thrusts may disturb the vehicle behavior and cause uneven wear of the tread 3.

In fact, a limiting block 5 formed by two symmetrically disposed plies 51, 52 (e.g., at angles $-\alpha$ and $+\alpha$) basically generates such harmful thrusts, because the two plies 51, 52 are not located at the same distance from the axis of rotation of the tire 1. Consequently, a limiting block 5 which does not generate lateral thrusts has its wires or cables disposed at asymmetrical angles $\alpha$. By preference, the limiting block-ply 51, the wires or cables of which are oriented at the greater angle should be disposed radially inside the other ply 52. A satisfactory angular arrangement is thus 8° for the radially inner ply 51 and 3° for the radially outer ply 52.

What is claimed is:

1. A tire with a radial carcass reinforcement anchored on both sides to at least one bead ring and with a tread reinforcement which comprises a work ply extending approximately over the width of the tread and arranged between two other work plies, one extending approximately over one-half of the width of the tread and the other extending approximately over the other half of the width of the tread, the wires or cables of each work ply being parallel to each other and crossed from one work ply to the next forming angles of less than 45° with the longitudinal direction of the tire, the tread reinforcement and the radial carcass reinforcement being parallel to each other along an equatorial zone, characterized by the fact that in a zone centered on the equator and narrower than an equatorial zone in which the two reinforcements are parallel to one another there is arranged, between the radial carcass reinforcement and the tread reinforcement, a limiting block formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement, this limiting block being parallel to the radial carcass reinforcement and further characterized by the fact that the wires or cables of low extensibility of the limiting block have a relative elongation less than 0.2% under a load equal to 10% of their rupture load.

2. The tire according to claim 1, characterized by the fact that the opposite angles formed by the wires or cables of the two plies of the limiting block are asymmetrical with the longitudinal direction of the tire.

3. The tire according to claim 2, characterized by the fact that the wires or cables of the radially inner ply of the limiting block form a greater angle than that of the wires or cables of the radially outer ply of the limiting block.

4. The tire according to claim 3, characterized by the fact that the angle of the wires or cables of the radially inner ply is 8° and the angle of the wires or cables of the radially outer ply is 3° in absolute value.

5. The tire according to claim 1, characterized by the fact that the opposite angles formed by the wires or cables of the two plies of the limiting block are symmetrical with the longitudinal direction of the tire.

6. The tire according to claim 5, characterized by the fact that the opposite symmetrical angles formed by the wires or cables of the two plies of the limiting block are between 5° and 10° in absolute value.

7. The tire according to claim 2 or claim 5, characterized by the fact that the limiting block has an axial width between 60% and less than 100% of the width of the equatorial zone along which the tread reinforcement is parallel to the radial carcass reinforcement.

8. The tire according to claim 2 or claim 5, characterized by the fact that the limiting block has an axial width of between 5% and 80% of the maximum axial width of the radial carcass reinforcement and, more particularly, between 12% and 20% for a ratio H/B close to 1, between 24% and 40% for a ratio H/B close to 0.75, and between 45% and 80% for a ratio H/B close to 0.3, H being the radial height of the tire on its rim and B being the maximum axial width of the radial carcass reinforcement.

9. The tire according to claim 2 or claim 5, characterized by the fact that the cables of the limiting block have a cable lay of between 12 and 20 times the apparent diameter of the cable.

10. The tire according to claim 2 or claim 5, characterized by the fact that the wires or cables of the limiting block are arranged contiguous to each other.

11. The tire according to claim 2 or claim 5, characterized by the fact that one ply of the limiting block has a width which is between 100% and 90% of the width of the other ply.

12. The tire according to claim 5, characterized by the fact that the limiting block is formed of a folded ply.

* * * * *